Figure 1:
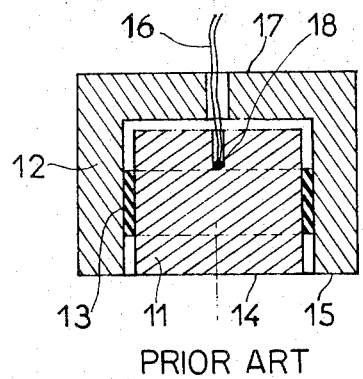

United States Patent
Jamet et al.

[11] 3,822,580
[45] July 9, 1974

[54] APPARATUS FOR THE MEASUREMENT OF HEAT EXTRACTION COEFFICIENTS

[75] Inventors: Jean F. Jamet, Janvry; Daniel L. Balageas, Vincennes, both of France

[73] Assignee: Office National d'Etudes et de Recherches Aerospatiales, Chatillon-sous-Bagneux, France

[22] Filed: Dec. 13, 1971

[21] Appl. No.: 207,219

[52] U.S. Cl. ................................................. 73/15 R
[51] Int. Cl. ........................................... G01h 25/00
[58] Field of Search .......................... 73/15, 190, 359

[56] References Cited
UNITED STATES PATENTS

| | | | |
|---|---|---|---|
| 3,266,307 | 8/1966 | Winter | 73/190 |
| 3,267,728 | 8/1966 | Solomons | 73/190 |
| 3,279,239 | 10/1966 | Arends et al. | 73/15 |
| 3,605,490 | 9/1971 | Progelhof et al. | 73/190 |
| 3,662,587 | 5/1972 | Allen et al. | 73/15 |

*Primary Examiner*—Herbert Goldstein
*Attorney, Agent, or Firm*—Larson, Taylor & Hinds

[57] ABSTRACT

The apparatus includes a feeler constituted by two masses of good heat-conducting metal of which the central mass is called a measuring mass and the other mass is a protective mass surrounding the former mass at a short distance. The two masses are separated by a thin layer of a heat insulating medium. Each mass has a contact surface with the body to be measured. The contact surfaces are situated on a same continuous surface of measuring means for the temperature of the measuring mass. Means for measuring the difference in temperature of the two masses and electrical heating means surrounding the protective mass, are provided. Automatic controls can be included. The apparatus is useful for non-destructive testing.

2 Claims, 4 Drawing Figures

PATENTED JUL 9 1974  3,822,580

SHEET 1 OF 2

APPARATUS FOR THE MEASUREMENT OF HEAT EXTRACTION COEFFICIENTS

The invention relates to an apparatus for measuring the heat extraction coefficient, sometimes called "effusivity," of solids, that is to say the magnitude defined by the relationship:

$$s = \sqrt{\lambda c \rho}$$

in which:
- $s$: is the coefficient concerned,
- $\lambda$: the thermal conductivity,
- $c$: the specific heat and
- $\rho$: the specific gravity.

When two solids brought to different temperatures are placed in contact, the heat transfer which is initiated is a function, all other things being equal, of the respective values of the said coefficient for each of the said bodies.

For a particular material, the local value of the said coefficient depends not only on the composition and the constitution of the said material but also on its compacity. Thus the determination of the said coefficient, in other words the aptitude of the said material to exchange heat by contact with another material, can constitute a nondestructive testing method in particular in the case of composite materials which lend themselves poorly to testing by conventional methods. In addition, the measurement of the said coefficient can have in itself an obvious industrial interest if the parts or elements to be tested are called upon, in the course of utilization, to cooperate in heat transfer.

There have already been produced instruments for the measurement of the heat extraction coefficient. One example of such an instrument, which has been named a "touchau" because it operates by contact with the solid to be tested or checked, is illustrated in FIG. 1. This is a feeler of which the active portion is a mass 11 of good heat-conducting metal, for example of copper, called the measuring mass. It is enveloped on all sides, with the exception of one surface 14, by another mass 12 also of good heat-conducting metal called protective mass. The two masses are rendered mechanically fast by means for example of an intermediate ring 13 of insulating material, but are thermally insulated by the said ring and by the gap caused by the said ring. The surface 14 of the measuring mass is coplanar with the annular surface 15 of the protective mass. A thermocouple 16 traverses the opposite surface 17 of the protective mass from which it is electrically insulated and by hot welding 18 is inserted in the measuring mass.

There is given below by way of indication, the summarized mode of operation of this instrument without dwelling on the numerous precautions to be observed. In order to determine the heat extraction coefficient of a solid, the touchau is first heated in an oven to bring it to a temperature above that of the solid; for example to 50° C if the solid is at ambient temperature. After having ensured that the temperature of heating has been long enough for the temperature of the touchau to be uniform, it is placed by its surface 14–15 on a flat surface of the solid which has been previously slightly greased to avoid the interposition of a layer of air then the temperatures indicated by the galvanometer connected to the thermocouple 16 are noted or recorded. It is assumed that the protective mass is cooled at the same rate as the measuring mass and that their facing walls remain at the same temperature and that, consequently, the measuring mass only loses its heat through its interface with the solid to be tested, the conditions indispensable for correct measurement, and in particular the perpendicularity of the lines of heat flux and of the interface, being thus ensured. The temperature curve obtained can be exploited in several ways, either for example by comparing it with the curves given by bodies of known heat extraction coefficient, or by using it to calculate the said coefficient taking into account the thermal characteristics of the touchau.

In fact, the hypotheses assumed above are optimistic and the apparatus has drawbacks which render it unsuitable for precise measurements and particularly for repeated measurements. First of all it is inaccurate and untrue, on one hand because the protective mass, which loses heat by radiation from its outer walls, cools more quickly than the measuring mass and plays poorly its role as a screen, on the other hand, because the contact between the touchau and the solid is only truly ensured if the surfaces in contact are of strictly complementary shape and if the solid has an excellent surface condition. Furthermore, the good execution of the various phases of the method of operation, to guarantee correct measurements, depends to too large an extent on the competence and the handling of the operator and is difficult to reproduce.

It is an object of the invention to provide an improved apparatus for the measurement of the heat extraction coefficient which is free of these drawbacks and which enables in particular the realisation without manual intervention of rapid, accurate and true measurements without requiring the employment of qualified personel. The apparatus according to the invention is hence well adapted for nondestructive industrial testing.

The apparatus for the measurement of the heat extraction coefficient according to the invention is constituted by the following elements:

a. a touchau, otherwise called a feeler comprising as in the prior art a measuring mass of which all the surfaces, with the exception of the surface of contact with the body to be tested, are surrounded by a protective mass fast to, but thermally insulated from, the said measuring mass, a thermometric probe of which the active portion is inserted in the measuring mass and means for recording the temperatures measured by the said probe and comprising in addition a differential thermometric probe to measure the difference in temperature between the said masses and a heating resistance surrounding the protective mass.

b. a supporting chassis for the said feeler comprising means to place the said feeler in contact position with the body to be tested and means to separate the said feeler from the said position.

c. supply means for the said heating resistance and means to control the value of the power to the value of the difference in temperatures measured by the differential thermometric probe.

d. means to release automatically at an appropriate time the following operational phases:
supply of the heating resistance of the feeler,
control of the supply power of the said resistance according to the indications of the differential thermal probe of the feeler, registering and/or recording of the temperatures of the feeler, application of the feeler to the body to be tested, removal of the feeler and stopping the apparatus.

In addition, the feeler can be equipped with contact pastilles of an elastomer filled with a powder of a body which is a good heat-conductor to ensure a good thermal contact with the body to be tested even when the surfaces in contact are not of complementary shape or when the body has a rough surface.

It will be noted that the feeler of the apparatus according to the invention constitutes in itself an improved touchau manually usable.

Figure 2:
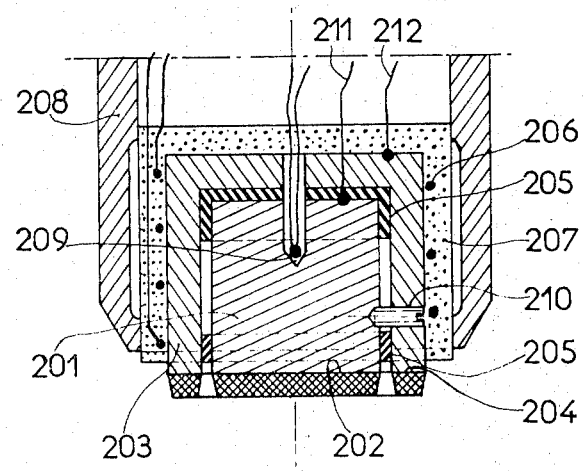
Figure 3:
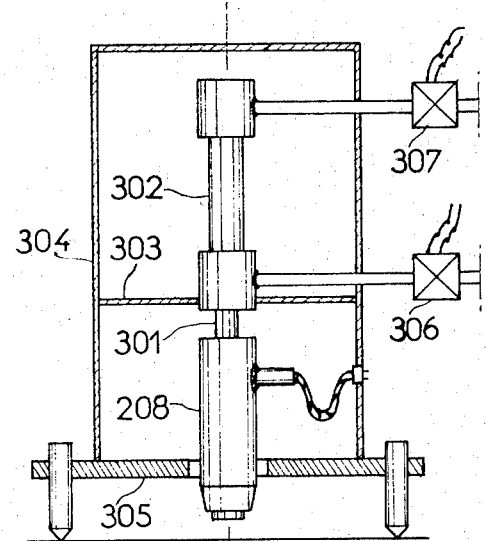
Figure 4:
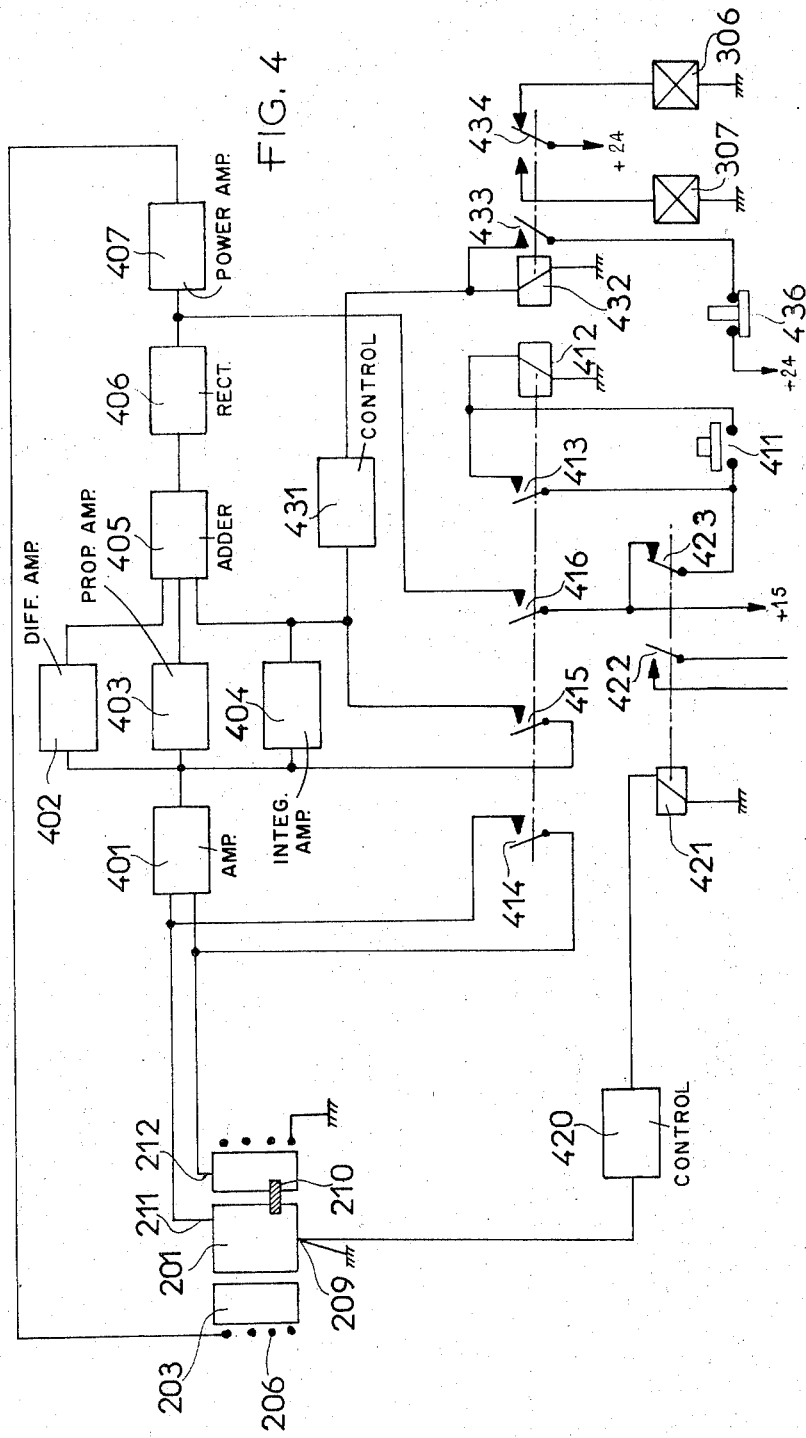

There will now be given non-limiting examples of the production of an apparatus according to the invention with reference to the following Figures:

FIG. 2, which is a diagrammatic section of a feeler of the apparatus according to the invention, FIG. 3, which is a sketch of the stator bearing the said feeler, and FIG. 4, which is a diagram of means applied to ensure the automatic operation of the apparatus.

The feeler shown in FIG. 2 comprises a measuring mass 201, of a good heat-conducting metal, for example of copper, of which all the surfaces, except the lower surface 202, are enveloped by the protective mass 203 which has its lower surface 204 coplanar with the surface 202.

The two masses are made mechanically fast and thermally insulated by insulating wings or pastilles 205 advantageously of epoxy resin. The mass 203 is surrounded by a heating resistance 206 buried in a shield 207 of epoxy resin which serves at the same time to insulate and provide mechanical protection of the resistance 206 as well as for holding the assembly in a stainless steel tube 208.

A heat probe 209, for example a thermo-couple, is inserted in the measuring mass 201 and its output wire pass through the shield 207, a bore being provided in the mass 203 to avoid any electrical contact between the mass and the wires.

A small grub-screw 210, of an alloy constituting with the metal of the masses a good thermoelectric couple, for example of constantan is housed in a threaded bore formed in the lateral wall of the mass 203 and abuts on the mass 201. The conductors 211 and 212 respectively connected into the masses 201 and 203, constitute the connections of a differential thermoelectric couple indicating differences of temperature which can exist between the two masses.

The feeler thus constituted can be used mounted in the chassis of FIG. 3. It is then fixed by its sheath 208 on the movable rod 301 of a double-acting pneumatic jack 302 itself fixed on a flange 303 fast to a platform 305 by means of a sleeve 304, in which a bore enables free sliding of the sheath 208. Two electrovalves 306 and 307 enable the piston of the jack to be actuated in opposite directions, one to raise the feeler, the other to apply it to the solid to be tested with a predetermined load by adjusting the air pressure.

The measuring and control unit shown in FIG. 4 enables the feeler according to the invention to be exploited under optimal conditions.

There will be seen in this Figure the feeler with the masses 201 and 203, the heating resistance 206, the thermoelectric couple 209, the screw 210 constituting with the said masses a differential thermoelectric couple and the connections 211 and 212. There will here be found also the electrovalves 306 and 307 which control the jack of the chassis.

The unit comprises:

a supply circuit for the heating resistance 206 which delivers electric power controlled by the indications of the differential thermoelectric couple;

an actuating and automating device triggering at suitable times the various phases of a measurement.

The supply circuit comprises:

an amplifier 401 whose inputs are respectively connected to the outputs 211 and 212 and which delivers at the output a voltage proportional to the voltage at the input terminals;

a regulating stage forming from the said output voltage the voltage signal adapted for the regulation and comprising the requisite damping factors. This stage comprises three amplifiers in parallel 402, 403 and 404 giving respectively a differential voltage signal, a proportional voltage signal and an integrated voltage signal, of which signals the sum is formed by an adding stage 405.

a rectifying stage 406 whose role is to transmit only the voltage signals whose sign corresponds to a positive temperature difference between the measuring mass and the protective mass.

lastly a power amplifier stage 407 which supplies to the resistance 206 electrical power proportional to the amplitude of the said voltage signals.

When it is in operational state, the supply circuit described above comes into play therefore to heat the protective mass 203 when the latter takes up temperature substantially below that of the mass 201 but by weighting the power supplied.

The control and automating device will now be studied; its relays are all shown in FIG. 4 in the "resting" position and its operation in the course of the various phases of use of the apparatus described.

The chassis is placed on the body to be tested, the valve 306 being open that is to say the feeler being spaced in correlation with the position shown of the contact 434.

The phase called the pre-heating phase is triggered by a pulse to the pusher element 411 which actuates the relay 412 self-excited by the contact 413. The relay 412 actuates:

the closing of the contact 414 which short-circuits the inputs of the differential amplifier 401, the closing of the contact 415 which shunts the integrator 404 to cancel the voltage possibly present at its output, the closing of the contact 416 which applies a positive voltage to the input of the amplifier 407 which thus supplies the heating resistance 206 at constant voltage without intervention of the regulating circuit.

When the voltage of the thermo-couple 209, indicative of the temperature taken up by the measuring mass 201 under the effect of the heat radiated by the mass 203, reaches a predetermined value, it causes, by the action of a control stage 420 the operation of the relay 421 which closes the contact 422 of a device not shown in the Figure and which records the temperatures measured by the thermo-couple 209, and opens the contact 423 which cuts off the energizing current from the relay 412. The latter opens the contacts 414, 415 and 416 and the supply circuit starts to operate and to regulate the power supplied to the heating resistance 206 as a function of the differences in temperature of the masses 201 and 203.

When the output voltage of the integrator 404 reaches a known value which has been determined by calibration as corresponding to substantial equality of the temperatures of the masses, a control stage 431 connected to the said integrator tirggers the tilting of the relay 432. The latter, self-excited by the contact 433, triggers the tilting of the relay 434, thus actuating the closing of the electrovalve 306 and the opening of the electrovalve 307 and the jack 302 applies the feeler on to the surface of the body to be tested.

The measuring phase then commences and the temperature of the mass being measured 201, still being recorded, drops rapidly.

When it falls to one side of a known value for which the control stage 420 has been adjusted, the latter actuates the tilting of the relay 421 and hence the opening of the contact 422 causing the stopping of the recording and the opening of the contact 423.

It suffices to exert a push on the pushrod 436 to cut off the energization of the relay 432, to cause the opening of the contact 433 and the tilting of the contact 434. The feeler moves away and the apparatus is ready for a new test.

We claim:

1. An instrument for the measurement of the heat extraction coefficient of solid bodies comprising a feeler constituted by two masses of good heat-conducting material, said masses comprising a central, measuring mass and a peripheral, protective mass surrounding the central mass and separated therefrom by a thin layer of a heat insulating medium, the two masses having coplanar surfaces for simultaneous contact with the body to be measured, first temperature measuring means for measuring the temperature of the measuring mass, second temperature measuring means for measuring the difference in the temperature of the two masses, displacement control means for placing the feeler in a position in contact with the surface to be tested and for separating the feeler from said position, electrical heating means surrounding the protective mass, power control means for controlling the power input to the heating means, and automatic means connected to said first and second temperature measuring means for triggering at appropriate times the following operational phases; the initial supply of power to the heating means of the protective mass for heating the two masses, the supply of further power to the heating means by the power control means in accordance with the difference in temperature of the two masses when the temperature of the measuring mass reaches a predetermined value, and operation of the displacement control means for placing the feeler in a position in contact with the solid to be tested when the temperatures of the two masses are substantially the same and for separating the feeler from said position, the contact surfaces each being covered with a layer of an elastomer filled with a powder of a body which is a good heat-conductor.

2. An instrument for the measurement of the heat extraction coefficient of solid bodies comprising a feeler constituted by two masses of good heat-conducting metal, said masses comprising a central, measuring mass and a peripheral, protective mass surrounding the central mass and separated therefrom by a thin layer of a heat insulating medium, the two masses having coplanar surfaces for simultaneous contact with the body to be measured, first temperature measuring means for measuring the temperature of the measuring mass, second temperature measuring means for measuring the difference in temperature of the two masses, a supporting chassis for the feeler comprising displacement control means for placing the feeler in a position in contact with the solid to be tested with a predetermined force and for separating the feeler from said position, electrical heating means surrounding the protective mass and comprising a heating resistance, means for delivering electrical power to said heating resistance, means for controlling said power in accordance with the difference in temperature between the two masses when the temperature of the measuring mass as measured by the first measuring means reaches a predetermined value, an automatic means connected to said first and second temperature measuring means for triggering the following operational phases: the initial supply of power to the heating resistance of the protective mass for heating the two masses, the control of said supply of power to the heating resistance by said power controlling means in accordance with the difference in temperature of the two masses as measured by said second measuring means when the temperature of the measuring mass reaches said predetermined value, and the operation of said displacement control means so as to place the feeler in a position in contact with the solid to be tested when the temperatures of the two masses are substantially equal and to separate the feeler from said position.

* * * * *

UNITED STATES PATENT OFFICE
CERTIFICATE OF CORRECTION

Patent No. 3,822,580     Dated July 9, 1974

Inventor(s) Jean F. Jamet et al.

It is certified that error appears in the above-identified patent and that said Letters Patent are hereby corrected as shown below:

On the cover page, enter the following claim of priority:

--[30] Claims priority on French Patent Application Serial No. 70-45,734 filed on December 18, 1970.--

Signed and sealed this 1st day of July 1975.

(SEAL)
Attest:

RUTH C. MASON
Attesting Officer

C. MARSHALL DANN
Commissioner of Patents
and Trademarks